(12) United States Patent
Shimizu

(10) Patent No.: US 6,877,583 B2
(45) Date of Patent: Apr. 12, 2005

(54) CABLE-TYPE STEERING DEVICE WITH VARIABLE STEERING GEAR RATIO

(75) Inventor: Yasuo Shimizu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/375,925

(22) Filed: Feb. 27, 2003

(65) Prior Publication Data

US 2003/0197360 A1 Oct. 23, 2003

(30) Foreign Application Priority Data

Mar. 13, 2002 (JP) ..................................... 2002-068957

(51) Int. Cl.⁷ ................................................ B62D 5/04
(52) U.S. Cl. ...................... 180/444; 280/773; 180/421
(58) Field of Search ............................... 180/433, 446, 180/444, 421, 422; 280/771, 773

(56) References Cited

U.S. PATENT DOCUMENTS

| | | | | |
|---|---|---|---|---|
| 1,692,666 A | * | 11/1928 | Koons ......................... | 114/150 |
| 3,088,449 A | * | 5/1963 | Hockaday et al. ......... | 123/179.1 |
| 4,850,606 A | * | 7/1989 | Weisgerber et al. ... | 280/93.513 |
| 5,885,080 A | * | 3/1999 | Letovsky ..................... | 434/62 |
| 6,006,853 A | * | 12/1999 | Shimizu et al. ............ | 180/444 |
| 6,125,962 A | * | 10/2000 | Shimizu et al. ............ | 180/400 |

FOREIGN PATENT DOCUMENTS

| | | | | |
|---|---|---|---|---|
| JP | 08-002431 | | 1/1996 | |
| JP | 09109912 A | * | 4/1997 | ............ B62D/7/08 |
| JP | 10-059197 | | 3/1998 | |
| JP | 2000-025623 | | 1/2000 | |

* cited by examiner

*Primary Examiner*—Kevin Hurley
(74) *Attorney, Agent, or Firm*—Carrier, Blackman & Associates, P.C.; Joseph P. Carrier; William D. Blackman

(57) ABSTRACT

A cable-type steering device in which the steering gear ratio can be varied in accordance with the position of a steering wheel comprises operating cables wound around an outer peripheral surface of a driving pulley rotatably connected to a steering wheel and an outer peripheral surface of a follower pulley rotatably connected to a steering gear box for steering wheels so that a steering torque input to the steering wheel is transmitted through the operating cables to the steering gear box. The driving pulley is of a barrel-shape with the diameter being larger at an axially central portion and smaller at axially opposite ends. The follower pulley is of a bobbin-shape or sand-clock-shape with the diameter being smaller at an axially central portion and larger at axially opposite ends. Thus, the steering gear ratio (a ratio of the steering angle of the steering wheel/a transmitted steering angle for the wheels) can be varied in accordance with the position of the steering wheel.

9 Claims, 11 Drawing Sheets

US 6,877,583 B2

CABLE-TYPE STEERING DEVICE WITH VARIABLE STEERING GEAR RATIO

BACKGROUND OF THE INVENTION

1. Field of the Invention

The present invention relates to a cable-type steering device in which a steering wheel and a steering gear box are connected to each other by a flexible operating cable such as a Borden cable, and particularly to such a device with a variable steering gear ratio.

2. Discussion of Relevant Art

Conventional cable-type steering devices are known, for example, from Japanese Patent Application Laid-open Nos. 2000-25623, 10-59197 and 8-2431.

A driving pulley and a follower pulley in the conventional cable-type steering device are of the same columnar shape, and two operating cables are wound around grooves defined helically in outer peripheral surfaces of these pulleys. When a steering wheel is operated, one of the operating cables is wound around the driving pulley and drawn out of the follower pulley, and the other cable is drawn out of the driving pulley and wound around the follower pulley, whereby the rotation of the driving pulley is transmitted to the follower pulley.

Because the driving pulley and the follower pulley in the conventional cable-type steering device are of the same columnar shape, the steering gear ratio (a ratio of the steering angle of the steering wheel/a transmitted steering angle for wheels) is constant, irrespective of the position of the steering wheel. As a result, the steering characteristic cannot be made variable, e.g., from sensitive to obtuse, in accordance with the position of the steering wheel.

SUMMARY OF THE INVENTION

The present invention has been accomplished with such circumstances in view, and it is an object of the present invention to provide a cable-type steering device in which the steering gear ratio is variable in accordance with the position of the steering wheel.

To achieve the above object, according to a first aspect of the present invention, there is provided a cable-type steering device, comprising operating cables wound around an outer peripheral surface of a driving pulley rotatably connected to a steering wheel and an outer peripheral surface of a follower pulley rotatably connected to a steering gear box for steering wheels so that a steering torque input to the steering wheel is transmitted through the operating cables to the steering gear box, wherein the shape of a generatrix of the driving pulley and the shape of a generatrix of the follower pulley are different from each other.

With the above arrangement, the shape of the generatrix of the driving pulley and the shape of the generatrix of the follower pulley are different from each other, and hence the steering gear ratio can be varied in accordance with the position of the steering wheel.

According to a second aspect of the present invention, in addition to the arrangement of the first aspect, the diameter of the driving pulley is larger at an axially central portion and smaller at axially opposite ends, and wherein the diameter of the follower pulley is smaller at an axially central portion and larger at axially opposite ends.

With the above arrangement, the diameter of the driving pulley is larger at the axially central portion and smaller at the axially opposite ends, and wherein the diameter of the follower pulley is smaller at the axially central portion and larger at the axially opposite ends. Therefore, the steering gear ratio can be progressively increased as the steering wheel is operated from a neutral position toward either end position.

According to a third aspect of the present invention, in addition to the arrangement of the first aspect, the diameter of the driving pulley is smaller at an axially central portion and larger at axially opposite ends, and the diameter of the follower pulley is larger at an axially central portion and smaller at axially opposite ends.

With the above arrangement, the diameter of the driving pulley is smaller at the axially central portion and larger at the axially opposite ends, and the diameter of the follower pulley is larger at the axially central portion and smaller at the axially opposite ends. Therefore, the steering gear ratio can be progressively decreased as the steering wheel is operated from a neutral position toward either end position.

According to a fourth aspect of the present invention, in addition to the arrangement of any of the other aspects, the cable-type steering device further includes an actuator adapted to input a steering assisting torque to the steering gear box in accordance with a steering torque input to the steering wheel.

With the above arrangement, the actuator is driven in accordance with the steering torque input to the steering wheel, and hence the assisting torque of the actuator can be input to the steering gear box to decrease the load acting on the operating cables, thereby suppressing change in the steering gear ratio due to the elongation of the operating cables.

DETAILED DESCRIPTION OF THE INVENTION

A mode for carrying out the present invention will now be described by way of embodiments of the present invention with reference to the accompanying drawings.

FIGS. 1 to 8 show a first embodiment of the present invention.

Figure 1:
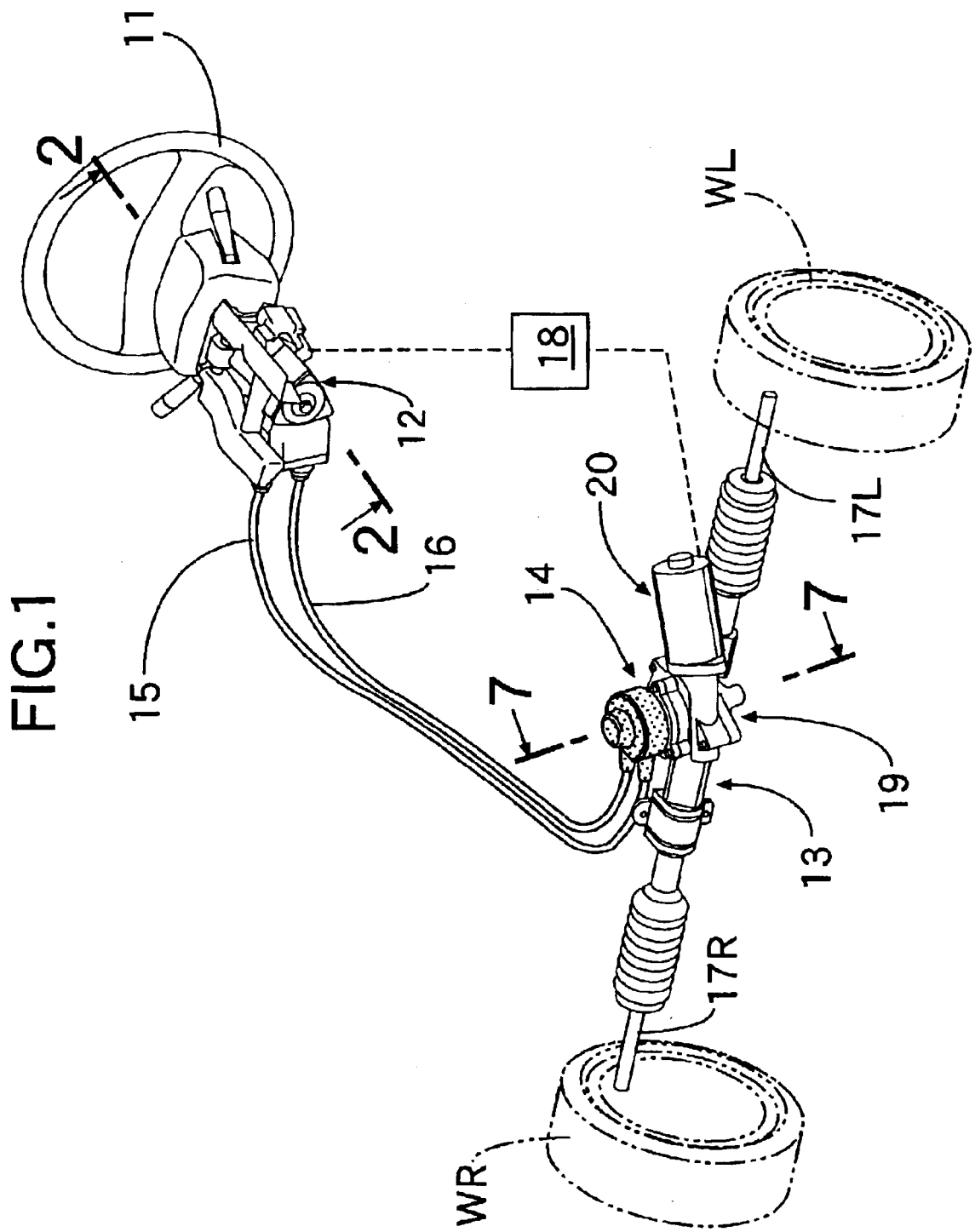
FIG. 1 is a perspective view of the entire arrangement of a cable-type steering device according to an embodiment of the present invention.

As shown in FIG. 1, a driving pulley casing 12 mounted in front of a steering wheel 11 of an automobile and a follower pulley casing 14 mounted above a steering gear box 13, are connected to each other by two operating cables 15 and 16 each comprising a Bowden cable. Tie rods 17L and 17R extending in a lateral direction of a vehicle body from opposite ends of the steering gear box 13 are connected to knuckles (not shown) which support left and right wheels WL and WR. A steering torque sensor for detecting a steering torque input to the steering wheel 11 is accommodated in the driving pulley casing 12. An actuator 20 mounted on a gear casing 19 integral with the follower pulley casing 14 is operated by a command from a control unit 18 to which a detected steering torque is input, thereby assisting the steering operation conducted by a driver.

Figure 2:
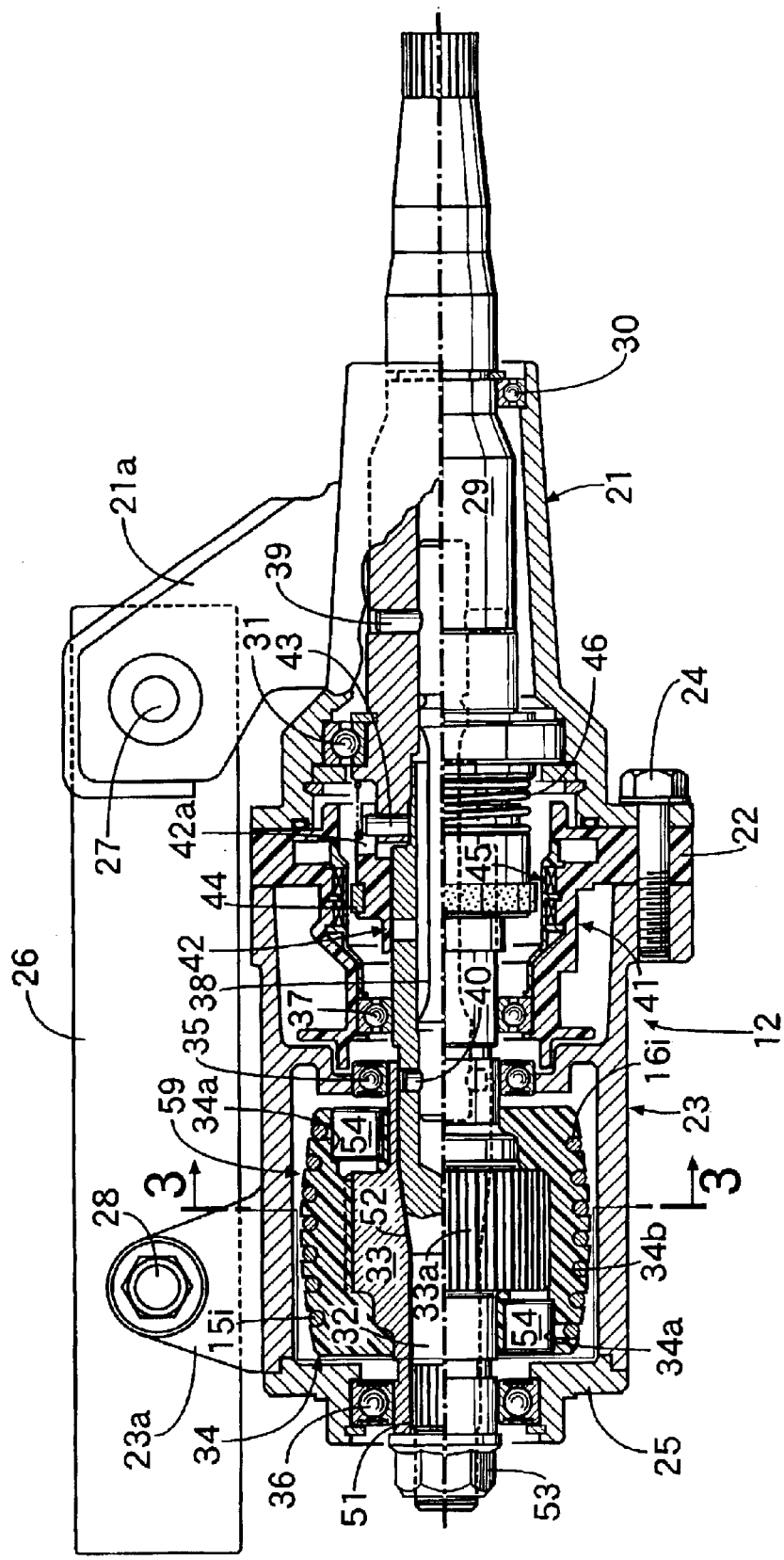
FIG. 2 is an enlarged sectional view taken along a line 2—2 in FIG. 1.

As shown in FIG. 2, the driving pulley casing 12 comprises a rear housing 21, a center housing 22 and a front housing 23 which are coupled together by bolts 24. A front cover 25 is coupled to a front face of the front housing 23 by a bolt which is not shown. In the driving pulley casing 12, a bracket 21a mounted on the rear housing 21 is fixed to a mounting stay 26 by a pin 27, and a bracket 23a mounted on the front housing 23 is fixed to the mounting stay 26 by a bolt 28.

A hollow steering shaft 29 connected to the steering wheel 11 is rotatably supported in the rear housing 21 with two ball bearings 30 and 31. A pulley boss 33 made of a metal is fixed to an outer periphery of a hollow pulley shaft 32 which is disposed coaxially with the steering wheel 11. A driving pulley body 34 made of a synthetic resin is integrally molded to cover a serration 33a formed on an outer periphery of the pulley boss 33. The pulley boss 33 is rotatably supported at its opposite ends on the front housing 23 and the front cover 25 by two ball bearings 35 and 36, respectively. The pulley shaft 32 is rotatably supported in the center housing 22 with a ball bearing 37. The pulley boss 33 and the driving pulley body 34 constitute a driving pulley 59 of the present invention.

An inner periphery of a front end of the steering shaft 29 is relatively rotatably fitted to an outer periphery of a rear end of the pulley shaft 32. Opposite ends of a torsion bar 38 are fitted into and coupled to a hollow of the steering shaft 29 and a hollow of the pulley shaft 32 by pins 39 and 40, respectively. Therefore, a steering torque input to the steering shaft 29 is transmitted from the steering shaft 29 through the torsion bar 38 to the pulley shaft 32. The steering torque sensor 41 mounted in the center housing 22 detects the steering torque, based on an amount by which the torsion bar 38 is twisted.

Figure 4:
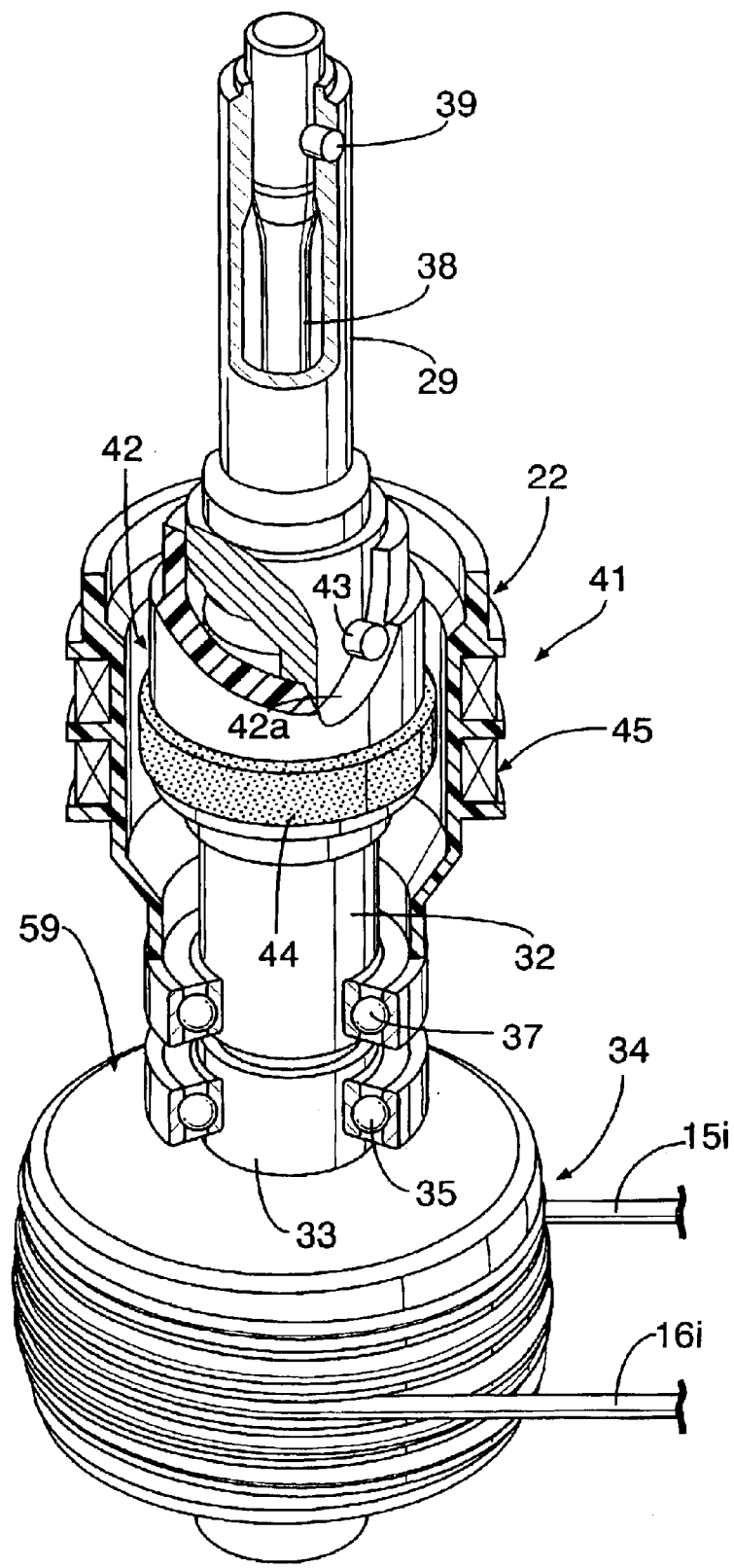
FIG. 4 is a perspective view of a steering torque sensor in the cable-type steering sensor.

As can be seen from FIGS. 2 and 4, the steering torque sensor 41 includes a cylindrical slider 42 which is relatively non-rotatably and axially slidably carried on an outer periphery of the pulley shaft 32; a guide pin 43 fixed to the steering shaft 29 and fitted in an inclined groove 42a defined in the slider 42; a magnetic ring 44 fixed on an outer periphery of the synthetic resin slider 42; a differential transformer 45 fixed to an inner periphery of the center housing 22 and opposed to the magnetic ring 44; and a coil spring 46 for biasing the slider 42 forwards to prevent a play between the guide pin 43 and the inclined groove 42.

Figure 5:
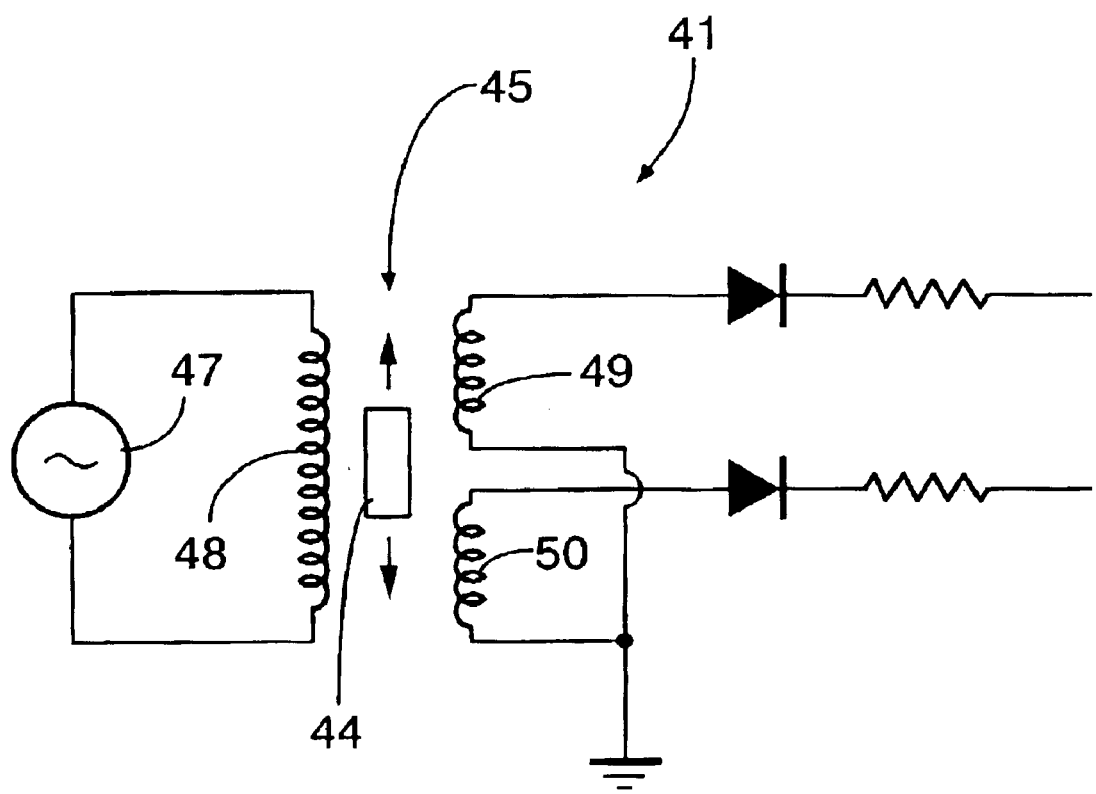
FIG. 5 is a circuit diagram of a differential transformer of the steering torque sensor.

As shown in FIG. 5, the differential transformer 45 of the steering torque sensor 41 includes a primary coil 48 connected to an AC power source 47, a first secondary coil 49 and a second secondary coil 50. The magnetic ring 44 constitutes a movable core disposed between the first and second secondary coils 49 and 50.

As can be seen from FIG. 2, a front end of the pulley shaft 32 and the pulley boss 33 are coupled to each other at a serration coupling portion 51 and through a tapered coupling portion 52 which is tapered toward the front end of the pulley shaft 32. A nut 53 is screwed over the front end of the pulley shaft 32, and its load biases the pulley boss 33 rearwards along the pulley shaft 32 so that the pulley shaft 32 and the pulley boss 33 are strongly integrally coupled to each other under a sufficient surface pressure via the tapered coupling portion 52. Thus, it is possible to overcome an influence of a very small play existing in the serration coupling portion 51 to inhibit the generation of a noise, and also to improve a steering feeling. Because the driving pulley 59 can be moved axially when the nut 53 is tightened, an excessive load is prevented from acting on the driving pulley casing 12.

Figure 3:
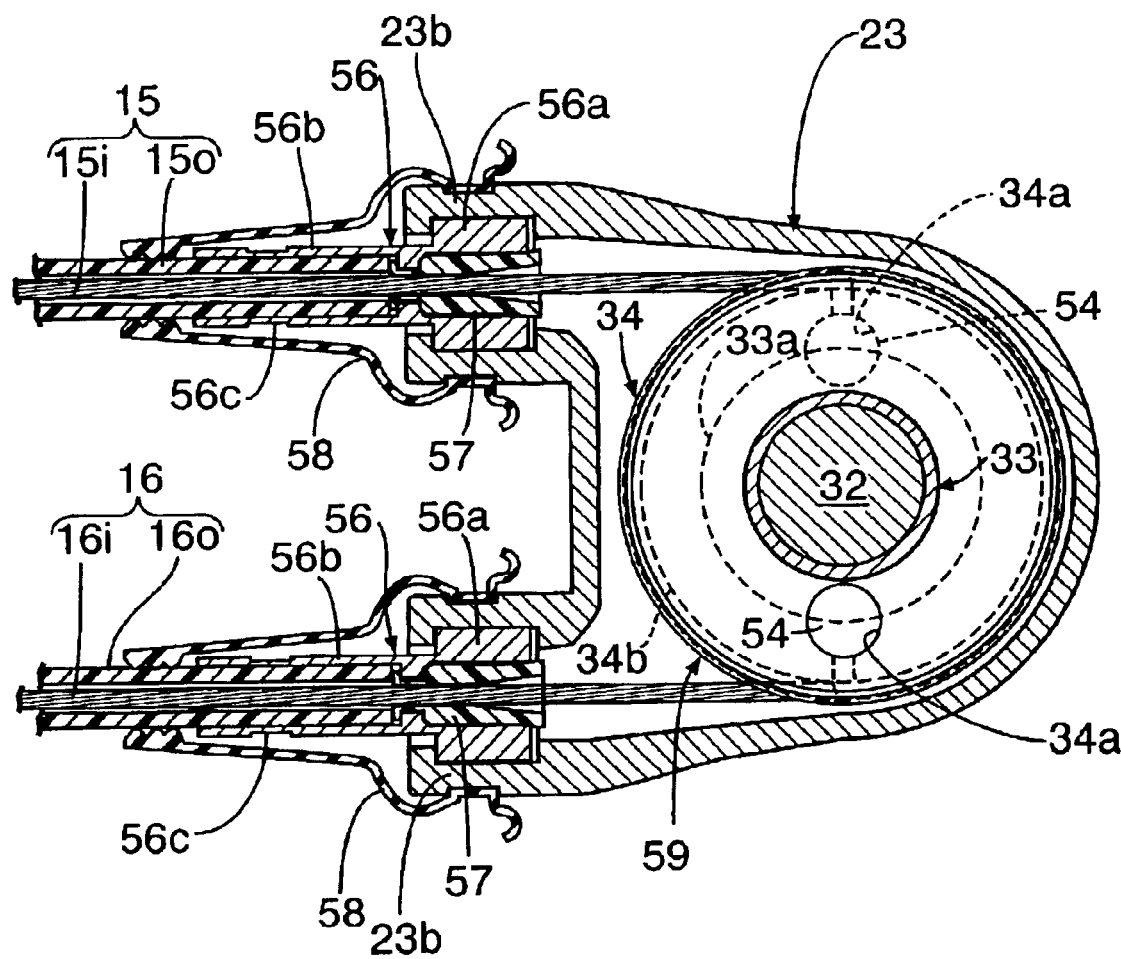
FIG. 3 is a sectional view taken along a line 3—3 in FIG. 2.

As can be seen from FIGS. 2 and 3, each of the two operating cables 15 and 16 is comprised of an outer tube 15o, 16o made of a synthetic resin, and inner cables 15i, 16i made of stranded metal wires slidably accommodated in the outer tube 15o, 16o. Short columnar pins 54, 54 fixed to ends of the two inner cables 15i and 16i are fitted in pinholes 34a, 34a defined in opposite end faces of the driving pulley body 34. The two inner cables 15i, 16i are wound in directions toward each other along a single spiral groove 34b defined in the outer periphery of the driving pulley body 34, and is then drawn out in a direction perpendicular to an axis of the pulley shaft 32.

Bottoms of the pinholes 34a, 34a in the driving pulley body 34 made of the synthetic resin reach a border between the serration 33a of the pulley boss 33 and the driving pulley body 34. In a state in which the pins 54, 54 are removed, the border can be visually observed with ease. Therefore, it is possible to reliably find a processing error such as that the driving pulley body 34 is molded in an inappropriate state in which there is no serration 33a formed on the pulley boss 33.

Two cylindrical connections 23b, 23b are formed on the front housing 23, and boss portions 56a, 56a of outer tube coupling members 56, 56 are fixed within the connections 23b, 23b. Pipe portions 56b, 56b extending from the boss portions 56a, 56a to the outside of the connections 23b, 23b are fitted over outer peripheries of the outer tubes 15o and 16o. Ends of the outer tubes 15o, 16o are fixed to the front housing 23 by caulking caulk portions 56c, 56c. Guide bushes 57, 57 made of a synthetic resin and having a good slipperiness are retained on inner peripheries of the boss portions 56a, 56a of the outer tube coupling members 56, 56 in order to prevent the inner cables 15i and 16i and the boss portions 56a, 56a from being rubbed directly against each other.

Rubber covers 58, 58 cover portions of the outer tubes 15o and 16o of the operating cables 15 and 16 between the outer peripheries of the connections 23b, 23b of the front housing 23 and predetermined positions (e.g., portions exposed from the pipe portions 56b, 56b of the outer tube coupling members 56, 56). The rubber covers 58, 58 having an elasticity are in close contact with the outer peripheries of the connections 23b, 23b of the front housing 23 and the outer peripheries of the outer tubes 15o and 16o to seal them, so that it is possible to prevent moisture from entering from gaps between the connections 23b, 23b and the caulk portions 56c, 56c of the outer tube coupling members 56, 56 for coupling the outer tubes 15o and 16o to the front housing 23 as well as the boss portions 56a, 56a of the outer tube coupling members 56, 56.

In the front cover 25 and the front housing 23 which accommodate the driving pulley 59, because the two ball bearings 35 and 36 supporting the pulley boss 33 are of a water proof type, there is no possibility that water will leak into the driving pulley 59. In this manner, the driving pulley 59 and the portions of the outer tubes 15o and 16o extending from the driving pulley 59 to the predetermined positions, are accommodated in a sealed space. Therefore, even if the driving pulley casing 12 is disposed in a vehicle compartment and drinking water dropped by an occupant is splashed on the driving pulley casing 12, it is possible to prevent the water from being deposited on slide portions of the outer tubes 15o, 16o and the inner cables 15i, 16i and thereafter frozen at a low temperature, to impede the smooth movement of the operating cables 15 and 16 and/or to rust the inner cables 15i, 16i to deteriorate the durability of the operating cables 15 and 16.

Figure 7:
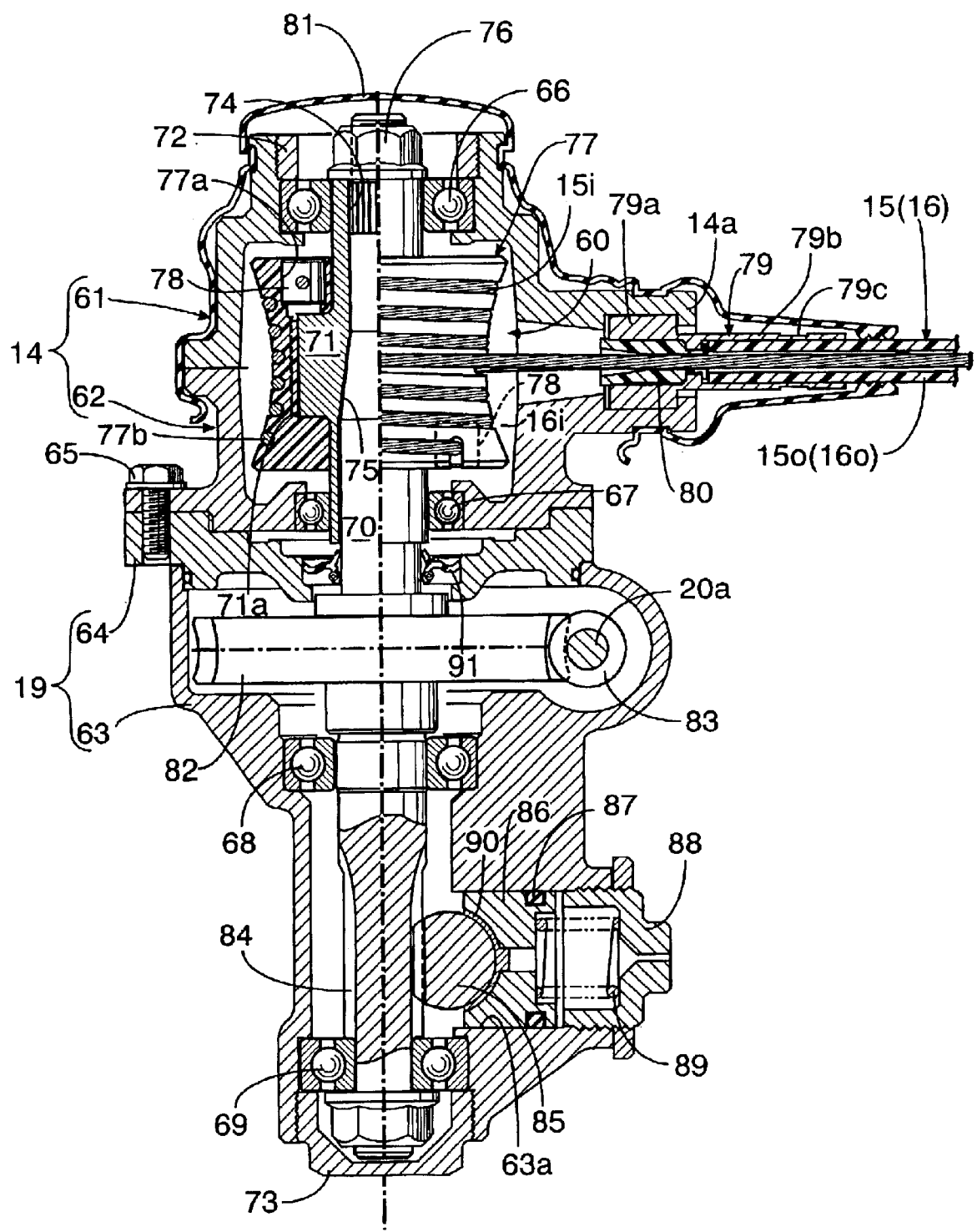
FIG. 7 is an enlarged sectional view taken along a line 7—7 in FIG. 1.

As shown in FIG. 7, the follower pulley casing 14 is comprised of an upper housing 61 and a lower housing 62 which are coupled to each other by a bolt (not shown). The gear casing 19 is comprised of a gear casing body 63 and an upper cover 64 which is coupled to an upper surface of the gear casing body 63 by a bolt (not shown). The lower housing 62 and the upper cover 64 are coupled to each other by a plurality of bolts 65.

A pulley shaft 70 is rotatably supported on a ball bearing 66 mounted on the upper housing 61, a ball bearing 67 mounted on the lower housing 62 and two ball bearings 68 and 69 mounted on the gear casing body 63. The upper two ball bearings 66 and 67 do not directly support the pulley shaft 70, but support a pulley boss 71 fixed to an outer periphery of the pulley shaft 70. The ball bearing 66 mounted on the upper housing 61 is prevented from slipping off by an annular nut 72. The lower ball bearing 69 mounted on the gear casing body 63 is prevented from slipping off by a cap nut 73.

An upper end of the pulley shaft 70 and the pulley boss 71 are coupled to each other at a serration coupling portion 74 and through a tapered coupling portion 75 which is tapered toward an upper end of the pulley shaft 70. A nut 76 is screwed over the upper end of the pulley shaft 70, and its load biases the pulley boss 71 rearwards along the pulley shaft 70 so that the pulley shaft 70 and the pulley boss 71 are strongly integrally coupled to each other under a sufficient surface pressure via the tapered coupling portion 75. Thus, it is possible to overcome an influence of a very small play existing in the serration coupling portion 74 to inhibit the generation of a noise, and also to improve a steering feeling. Because the follower pulley 60 can be moved axially when the nut 76 is tightened, an excessive load is prevented from acting on the follower pulley casing 14 and the gear casing 19.

A follower pulley body 77 made of a synthetic resin is integrally molded on a serration 71a around an outer periphery of the pulley boss 71, and short columnar pins 78, 78 fixed to the ends of the inner cables 15i and 16i of the two operating cables 15 and 16 are fitted into pinholes 77a, 77a defined in opposite end faces of the follower pulley body 77. The two inner cables 15i and 16i extending from the pins 78, 78 are wound in directions toward each other along a single spiral groove 77b defined in the outer periphery of the follower pulley body 77 and then drawn out in a direction perpendicular to an axis of the pulley shaft 70. The pulley boss 71 and the follower pulley body 77 constitute the follower pulley 60 of the present invention.

Bottoms of the pinholes 77a, 77a in the follower pulley body 77 made of the synthetic resin reach a border between the serration 71a of the pulley boss 71 and the follower pulley body 77. In a state in which the pins 78, 78 are removed, the border can be visually observed with ease. Therefore, it is possible to reliably find a processing error such as that the driving pulley body 34 is molded in an inappropriate state in which there is no serration 71a formed on the pulley boss 71.

Two cylindrical connections 14a, 14a are formed on the follower pulley casing 14, and boss portions 79a, 79a of outer tube coupling members 79, 79 are fixed within the connections 14a, 14a. Pipe portions 79b, 79b extending from the boss portions 79a, 79a to the outside of the connections 14a, 14a, are fitted over the outer peripheries of the outer tubes 15o and 16o. Ends of the outer tubes 15o and 16o are fixed to the follower pulley casing 14 by caulking caulk portions 79c, 79c. Guide bushes 80, 80 made of a synthetic resin and having a good slipperiness are retained on inner peripheries of the boss portions 79a, 79a of the outer tube coupling members 79, 79 in order to prevent the inner cables 15i and 16i and the boss portions 79a, 79a from being rubbed directly against each other.

A single rubber cover 81 covers portions of the outer tubes 15o and 16o of the operating cables 15 and 16 between substantially the entire follower pulley casing 14 via the connections 14a, 14a and predetermined positions (e.g., portions exposed from the pipe portions 79b, 79b of the outer tube coupling members 79, 79). The rubber cover 81 ensures not only that the caulk portions 79c, 79c of the outer tube coupling members 79, 79 into which moisture is most liable to enter can be reliably sealed, but also that moisture can be inhibited from entering from parting faces of the upper housing 61 and the lower housing 62 of the follower pulley casing 14 and from the ball bearing 66 supporting the upper end of the pulley shaft 70.

Thus, it is possible to enhance the water-proofing property of the follower pulley casing 14 disposed in a lower portion of the engine room and more liable to be wet with water than the driving pulley casing 12; to prevent moisture from being deposited on the slide portions of the outer tubes 15o and 16o and the inner cables 15i and 16i where it could be frozen at a low temperature to impede the smooth movement of the operating cables 15 and 16, and to also prevent the inner cables 15i and 16i from being rusted which could cause a deterioration in durability of the operating cables 15 and 16.

A worm wheel 82 fixed to the pulley shaft 70 and a worm 83 fixed to an output shaft 20a of the actuator 20 (see FIG. 1) comprising an electric motor, are meshed with each other at an upper portion of the gear casing 19 sealed from the follower pulley casing 14 via a seal member 91. A rack 85 of the steering gear box 13 (see FIG. 1) is meshed with a pinion 84 formed at a lower portion of the pulley shaft 70, and is biased at its meshed portion toward the pinion 84.

More specifically, a slide member 86 is slidably fitted into a through-bore 63a defined in the gear casing body 63 via an O-ring 87 interposed therebetween. A low-friction member 90 mounted on the slide member 86 is put into abutment against a back of the rack 85 by a repulsive force of a coil spring 89 disposed between a spring seat 88 threadedly coupled into the through-bore 63a and the slide member 86. Thus, when the rotation of the pulley shaft 70 is transmitted through the pinion 84 to the rack 85 to steer the wheels Wf, Wf, the rack 85 can be operated smoothly without receiving a large resistance against sliding while being prevented from being loosened and flexed.

As can be seen from comparison between FIG. 2 and FIG. 7, the driving pulley 59 is formed into a barrel-shape such that the diameter is largest at an axially central portion and decreased gradually therefrom toward axially opposite ends, and the follower pulley 60 is formed into a bobbin-shape or sand-clock-shape such that the diameter is smallest at an axially central portion and increased gradually therefrom toward axially opposite ends. In other words, a generatrix of the driving pulley 59 comprising a rotor has an arcuate curve with the axially central portion bulged outwards, and a generatrix of the follower pulley 60 comprising a rotor has an arcuate curve with the axially central portion depressed inwards. In other words, the generatrices can exactly fit to each other, that is, they have complementary shapes.

The operation of the embodiment of the present invention having the above-described arrangement will be described below.

A steering torque detected by the steering torque sensor 41 is input to the control unit 18, and the control unit 18 controls the operation of the actuator 20 based on the steering torque. More specifically, when the steering wheel 11 is operated to turn the vehicle, a steering torque is transmitted through the steering shaft 29 and the torsion bar 38 to the pulley shaft 32; the inner cable 15i, 16i of one of the operating cables 15 and 16 wound around the driving pulley body 34 is pulled, and the other inner cable 15i, 16i is loosened, as shown in FIG. 2; whereby the rotation of the driving pulley 59 is transmitted to the follower pulley 60. As a result, the pulley shaft 70 shown in FIG. 7 is rotated, so that a steering torque is transmitted through the pinion 84, the rack 85 and the tie rods 17L and 17R within the steering gear box 13 to the wheels WL and WR.

When no steering torque is input to the steering wheel 11, the torsion bar 38 is not twisted and the steering shaft 29 and the pulley shaft 32 are retained at the same phases. The guide pin 43 of the steering shaft 29 is located at a central portion of the inclined groove 42a, and the slider 42 is retained in a vertically central position, as shown in FIG. 6B. At this time, the magnetic ring 44 mounted on the slider 42 is located in a position halfway between the first secondary coil 49 and the second secondary coil 50, as shown in FIG. 5, and the voltages output from both the secondary coils 49 and 50 are equalized to each other, whereby the steering torque is detected as being zero.

Figure 6A:
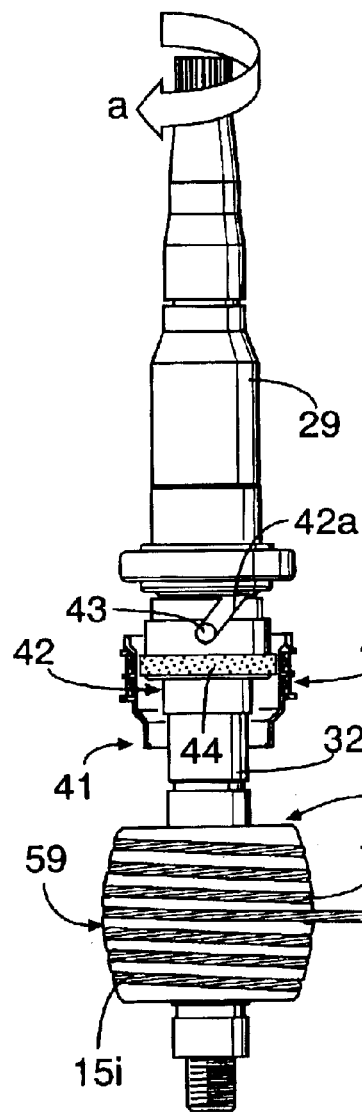
FIGS. 6A, 6B and 6C are views for explaining the operation of the steering torque sensor.
Figure 6B:
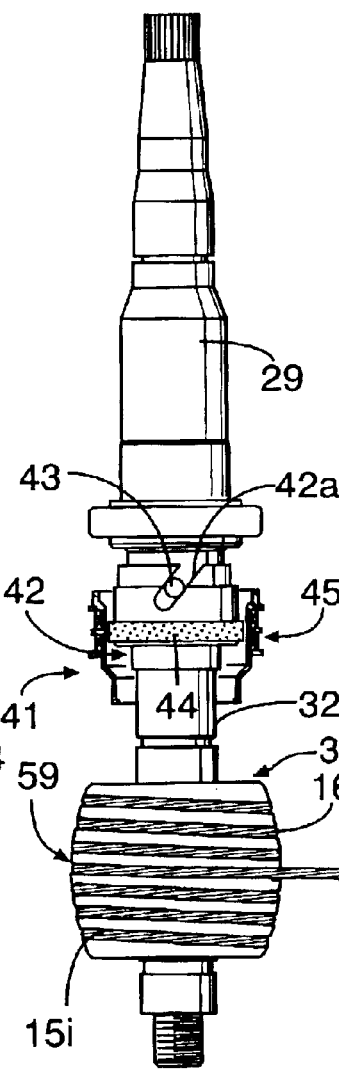
Figure 6C:
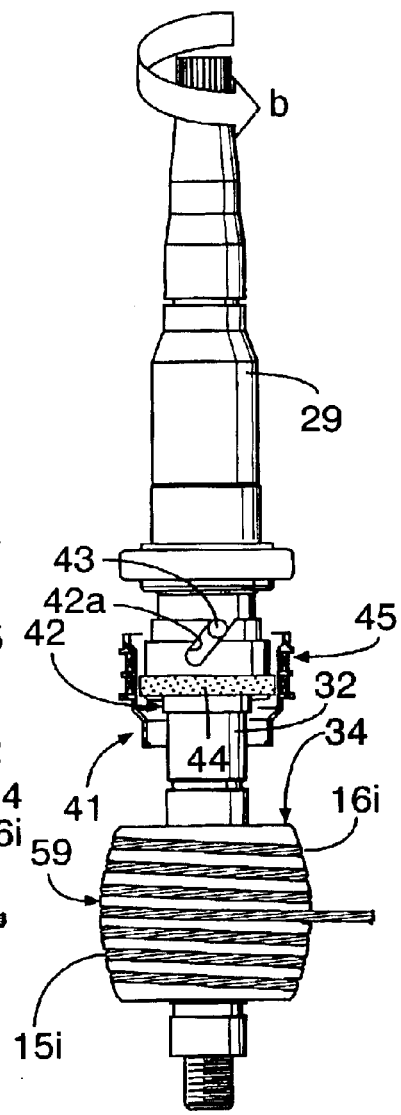

When the steering wheel 11 is operated rightwards, whereby a steering torque in a direction of an arrow a in FIG. 6A is input to the steering shaft 29, the torsion bar 38 is twisted to generate a difference in phase between the steering shaft 29 and the pulley shaft 32 (i.e., the slider 42 non-rotatable relative to the pulley shaft 32), so that the guide pin 43 of the steering shaft 29 pushes the inclined groove 42a to slide the slider 42 upwards. As a result, the voltage output from the upper first secondary coil 49 is increased, the voltage output from the lower second secondary coil 50 is decreased, and a steering torque in a rightward steering direction is detected based on a difference between such voltages. When the steering wheel 11 is operated leftwards, whereby a steering torque is input to the steering shaft 29 in a direction of an arrow b in FIG. 6C, the torsion bar 38 is twisted to generate a difference in phase between the steering shaft 29 and the pulley shaft 32 (i.e., the slider 42), so that the guide pin 43 of the steering shaft 29 pushes the inclined groove 42a to slide the slider 42 downwards. As a result, the voltage output from the upper first secondary coil 49 is decreased, the voltage output from the lower second secondary coil 50 is increased, and a steering torque in a leftward steering direction is detected based on a difference between such voltages.

When the steering torque is detected in the above manner by the steering torque sensor 41, the control unit 18 drives the actuator 20 so that the steering torque detected by the steering torque sensor 41 is maintained at a preset value. Thus, a torque of the actuator 20 is transmitted through the worm 83 and the worm wheel 82 to the pulley shaft 70, and the steering operation conducted by the driver is assisted. As a result, the load acting on the inner cables 15i and 16i of the operating cables 15 and 16 can be alleviated to minimize the elongation of the inner cables 15i and 16i, whereby the steering feeling is prevented from deteriorating. With the combination of the steering torque sensor 41 having the differential transformer 45 and the actuator 20, the actuator 20 can be operated with only the electrical control, leading to simplification of the structure of the control system.

Because the driving pulley 59 is of the barrel-shape and the follower pulley 60 is of the bobbin-shape or sand-clock-shape as described above, when the steering wheel 11 is disposed in the vicinity of a neutral position, the effective diameter of the driving pulley 59 is largest and the effective diameter of the follower pulley 60 is smallest. As a result, the steering gear ratio (the steering angle of the steering wheel/the transmitted steering angle for the wheels) is smallest. On the other hand, when the steering wheel 11 is disposed in the vicinity of an end position, the effective diameter of the driving pulley 59 is smallest and the effective diameter of the follower pulley 60 is largest, that is, the steering gear ratio is largest.

Figure 8:
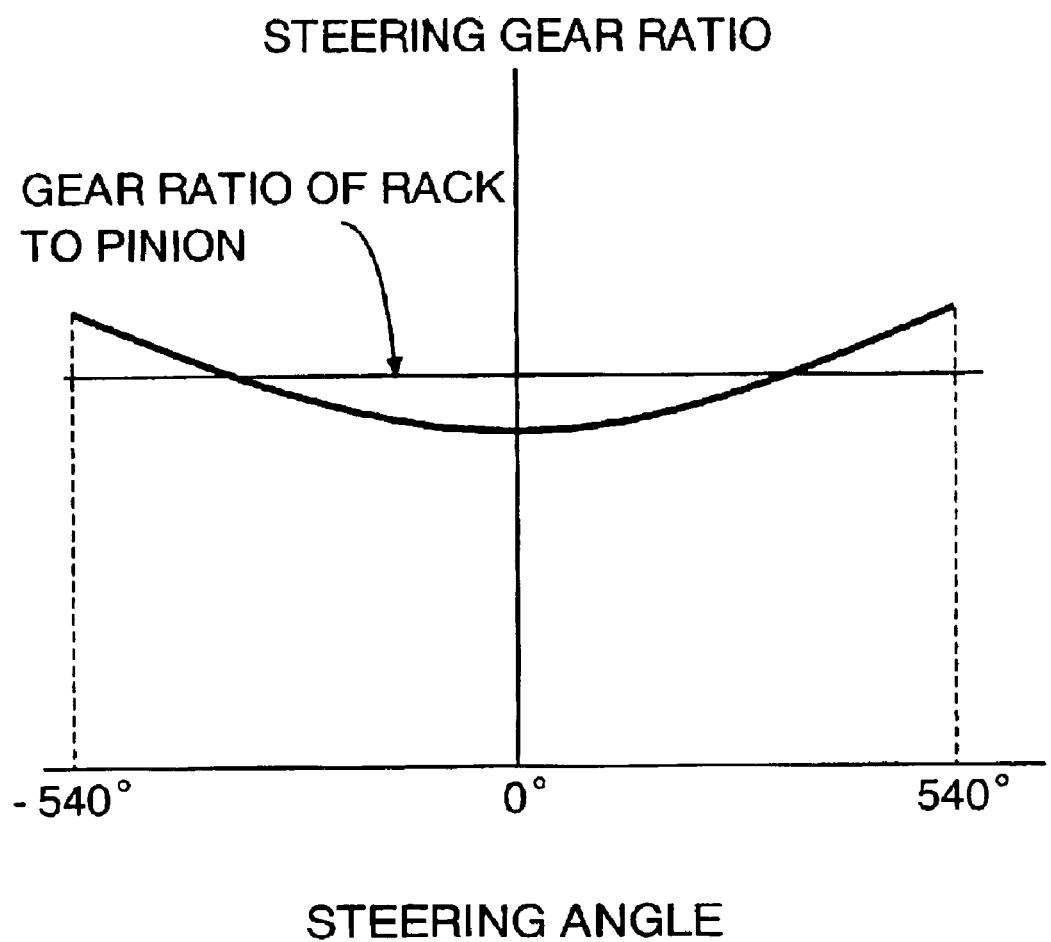
FIG. 8 is a graph showing the relationship between the steering angle and the steering gear ratio according to the first embodiment.

FIG. 8 shows the relationship of the steering gear ratio relative to the steering angle. If the driving pulley 59 and the follower pulley 60 are of columnar shapes having the same diameter, namely, if their generatrices form straight lines parallel to the rotary shaft, the steering gear ratio is a constant value (a gear ratio of the rack 85 to the pinion 84) irrespective to the steering angle. In the present embodiment, however, when the steering wheel 11 is in the vicinity of the neutral position, the steering gear ratio is smaller, so that the steering characteristic becomes sensitive. On the other hand, when the steering wheel 11 is in the vicinity of the end position, the steering gear ratio is larger, so that the steering characteristic becomes obtuse. Therefore, if the present embodiment is applied to a vehicle having an over-steering characteristic, the steering characteristic progressively becomes obtuse with an increase in the steering angle of the steering wheel 11, whereby the over-steering characteristic can be corrected to a neutral-steering characteristic.

As described above, by a simple modification of only differentiating the shapes of the driving pulley 59 and the follower pulley 60 from each other, the steering gear ratio can be progressively changed to provide a desired steering characteristic.

Figure 9:
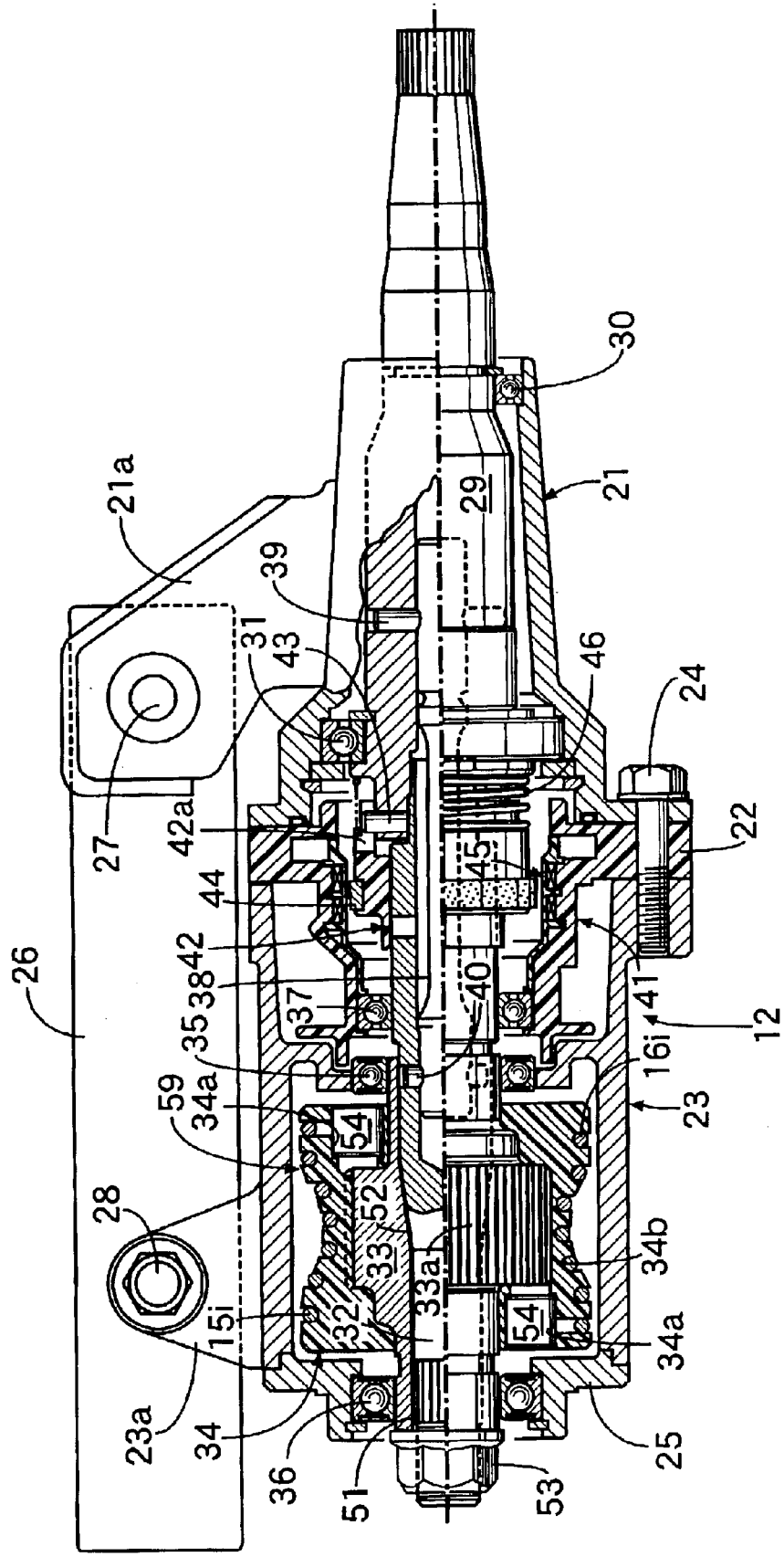
FIG. 9 is a view similar to FIG. 2, but according to a second embodiment.
Figure 10:
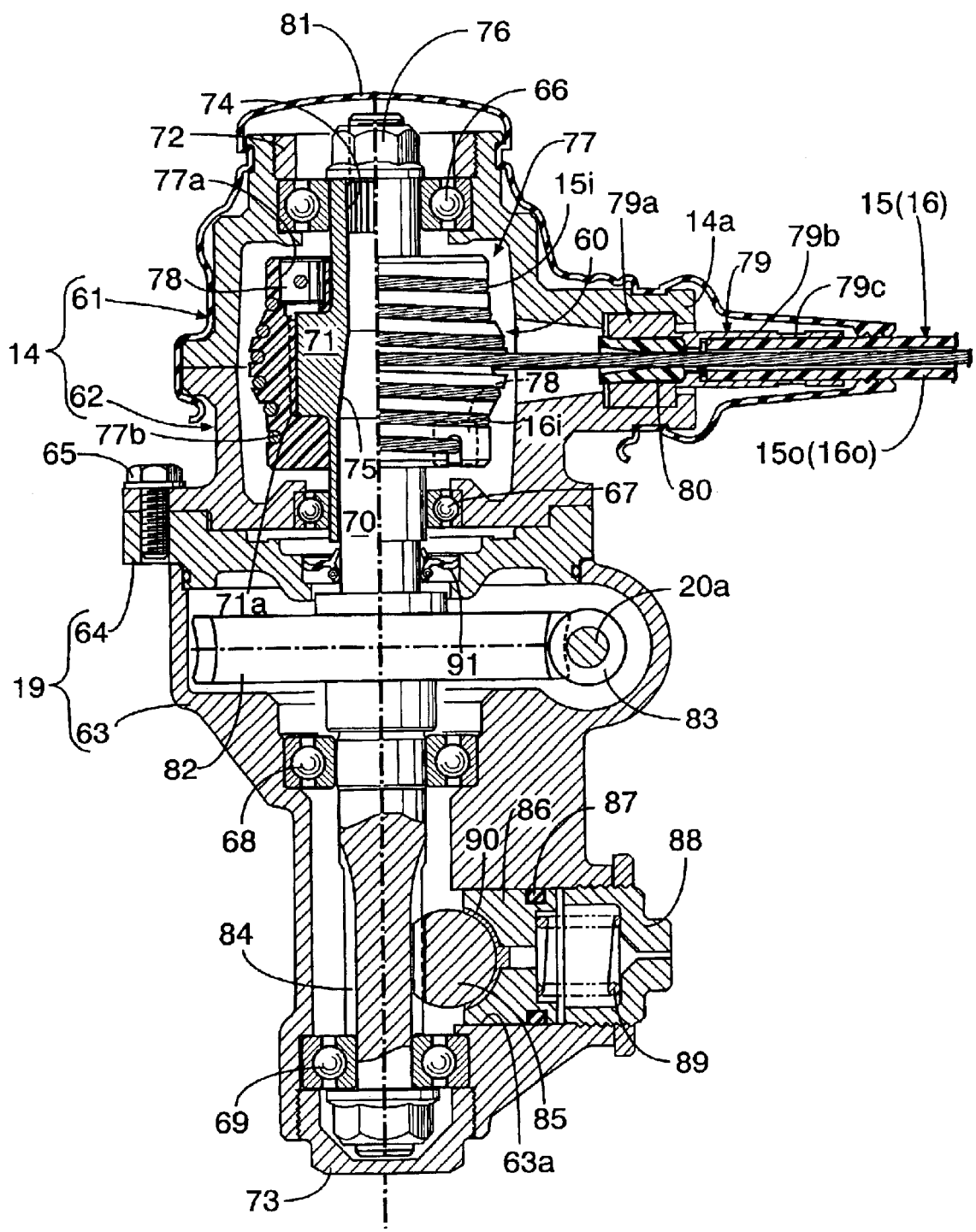
FIG. 10 is a view similar to FIG. 7, but according to the second embodiment.
Figure 11:
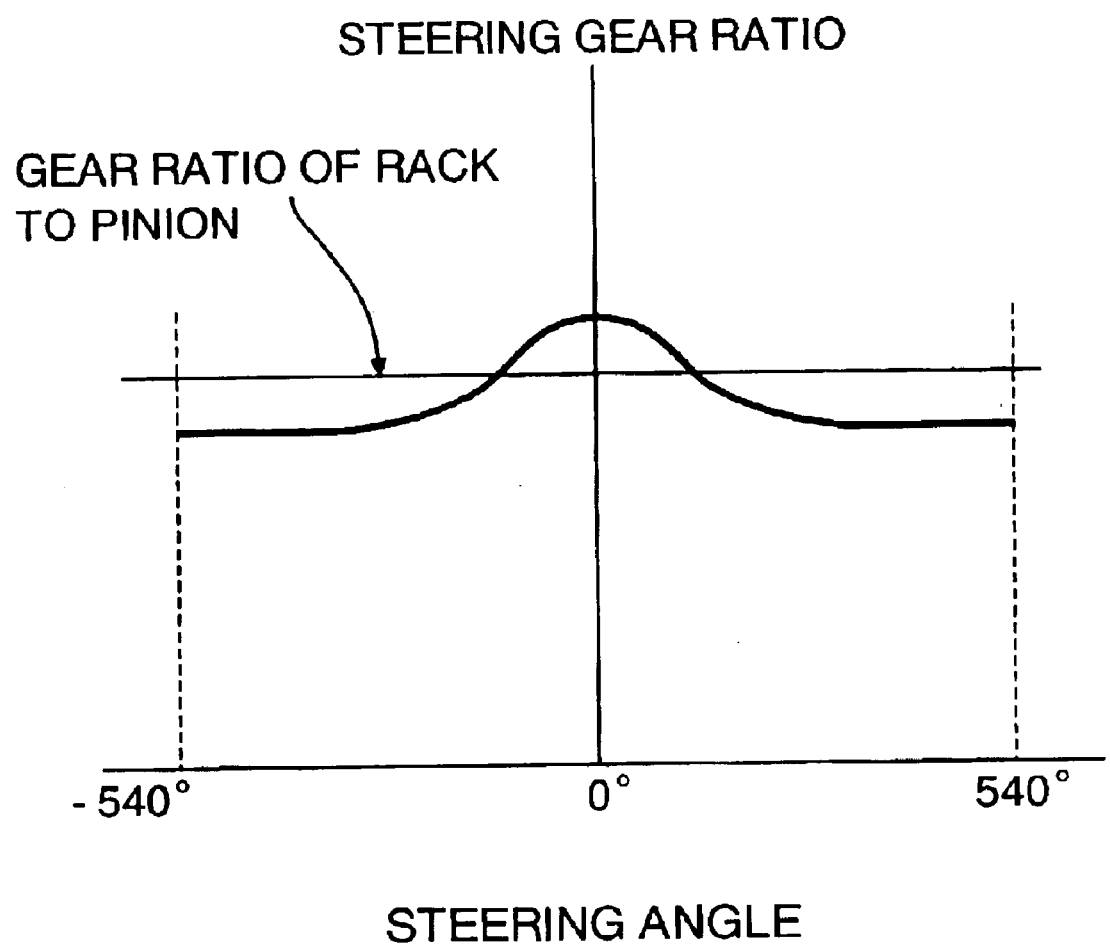
FIG. 11 is a graph showing the relationship between the steering angle and the steering gear ratio according to the second embodiment.

A second embodiment of the present invention will now be described with reference to FIGS. 9 to 11.

In the second embodiment, the shapes of a driving pulley 59 and a follower pulley 60 are different or reversed from those in the first embodiment, and the other structures are the same as in the first embodiment.

The generatrix of the follower pulley 60 in the second embodiment is bulged outwards at an axially central portion and parallel to the rotary shaft at axially opposite ends, and the generatrix of the driving pulley 59 is depressed inwards at an axially central portion and parallel to the rotary shaft at axially opposite ends. That is, both the generatrices have complementary shapes. As a result, a steering gear ratio characteristic shown in FIG. 11 is such that when the steering wheel 11 is in the vicinity of the neutral position, the steering ratio is larger, so that the steering characteristic becomes obtuse, and when the steering wheel 11 is in the vicinity of the end position, the steering ratio is smaller and constant, so that the steering characteristic becomes sensitive. Therefore, if the present embodiment is applied to a vehicle having an under-steering characteristic, the steering characteristic becomes sensitive with an increase in the steering angle of the steering wheel 11, whereby the under-steering characteristic can be corrected to a neutral-steering characteristic.

As discussed above, according to the first aspect of the present invention, the shape of the generatrix of the driving pulley and the shape of the generatrix of the follower pulley are different from each other, and hence the steering gear ratio can be varied in accordance with the position of the steering wheel.

According to the second aspect of the present invention, the diameter of the driving pulley is larger at the axially central portion and smaller at the axially opposite ends, and the diameter of the follower pulley is smaller at the axially central portion and larger at the axially opposite ends. Therefore, the steering gear ratio can be progressively increased as the steering wheel is operated from the neutral position toward either end position.

According to the third aspect of the present invention, the diameter of the driving pulley is smaller at the axially central portion and larger at the axially opposite ends, and the diameter of the follower pulley is larger at the axially central portion and smaller at the axially opposite ends. Therefore, the steering gear ratio can be progressively decreased as the steering wheel is operated from the neutral position toward either end position.

According to the fourth aspect of the present invention, the actuator is operated in accordance with the steering torque input to the steering wheel, and hence the assisting torque of the actuator can be input to the steering gear box to decrease the load acting on the operating cables, thereby suppressing the change in steering gear ratio due to the elongation of the operating cables.

Although the embodiments of the present invention have been described in detail, it will be understood that various modifications in design may be made without departing from the subject matter of the present invention.

For example, the generatrix of the driving pulley 59 and the generatrix of the follower pulley 60 need not be necessarily of the complementary shapes, as long as the shapes of the generatrices are different from each other. In addition, the shapes of the generatrices need not be necessarily curved.

As examples, one of the driving pulley 59 and the follower pulley 60 may be of a barrel-shape and the other may be of a bobbin-shape or sand-clock-shape so that they can have different radii of curvature without assuming the complementary shapes. Alternatively, one of the driving pulley 59 and the follower pulley 60 may be of a barrel-shape, and the other may be of a columnar shape, or one may be of a bobbin-shape or sand-clock-shape, and the other may be of a columnar shape. Further, both the driving pulley 59 and the follower pulley 60 may be of barrel-shapes with only radii of curvature different from each other, or both the driving pulley 59 and the follower pulley 60 may be of bobbin-shape or sand-clock-shapes with only radii of curvature different from each other. Namely, any variation is included in the present invention, excluding the case where the driving pulley 59 and the following pulley 60 are of the same shapes.

What is claimed is:

1. A cable-type steering device, comprising operating cables wound around an outer peripheral surface of a driving pulley rotatably connected to a steering wheel and an outer peripheral surface of a follower pulley rotatably connected to a steering gear box for steering wheels so that a steering torque input to the steering wheel is transmitted through the operating cables to the steering gear box, wherein the shape of a generatrix of the driving pulley and the shape of a generatrix of the follower pulley are different from each other, and wherein said shape of generatrices of said driving and follower pulleys are such that a steering gear ratio of the cable-type steering device is variable based on a position of the steering wheel.

2. A cable-type steering device according to claim 1, wherein the diameter of the driving pulley is smaller at an axially central portion and larger at axially opposite ends, and the diameter of the following pulley is larger at an axially central portion and smaller at axially opposite ends.

3. A cable-type steering device according to claim 1, further including an actuator adapted to input a steering assisting torque to the steering gear box in accordance with a steering torque input to the steering wheel.

4. A cable-type steering device according to claim 2, further including an actuator adapted to input a steering assisting torque to the steering gear box in accordance with a steering torque input to the steeling wheel.

5. A cable-type steering device according to claim 1, wherein said shapes of said generatrices of said driving and follower pulleys are complimentary to each other.

6. A cable-type steering device according to claim 1, wherein said shapes of said generatrices of said driving and follower pulleys are also such that a the variable steering gear ratio of the cable-type steering device can offset an under-steer characteristic or an over-steer characterist of the cable-type steering device.

7. A cable-type steering device, comprising operating cables wound around an outer peripheral surface of a driving pulley rotatably connected to a steering wheel and an outer peripheral surface of a follower pulley rotatably connected to a steering gear box for steering wheels so that a steering torque input to the steering wheel is transmitted through the operating cables to the steering gear box, wherein the shape of a generatrix of the driving pulley and the shape of a gerneratrix of the follower pulley are different from each other, wherein the diameter of the driving pulley is larger at an axially central portion and smaller at axially opposite ends, and wherein the diameter of the follower pulley is smaller at an axially central portion and larger at axially opposite ends.

8. A cable-type steering device according to claim 7, further including an actuator adapted to input a steering assisting torque to the steering gear box in accordance with a steering torque input to the steering wheel.

9. A cable-type steering device, comprising operating cable wound around an outer peripheral surface of a driving pulley rotatably connected to a steering wheel and an outer peripheral surface of a follower pulley rotatably connected to a steering gear box for steering wheels so that a steering torque input to the steering wheel is transmitted through the operating cables to the steering gear box, wherein the shape of a generatrix of the driving pulley and the shape of a generatrix of the follower pulley are different from each other, wherein the diameter of one of the driving pulley and the follower pulley is larger at an axially central portion and smaller at axially opposite ends, and wherein the diameter of the other of the driving pulley and the follower pulley is smaller at an axially central portion and larger at axially opposite ends.

* * * * *

UNITED STATES PATENT AND TRADEMARK OFFICE
CERTIFICATE OF CORRECTION

PATENT NO.    : 6,877,583 B2
DATED         : April 12, 2005
INVENTOR(S)   : Yasuo Shimizu It is certified that error appears in the above-identified patent and that said Letters Patent is hereby corrected as shown below:

Column 9,
Line 51, change "wherein said shape of generatrices" to -- wherein said shapes of said generatrices --.

Column 10,
Line 11, change "the steeling wheel." to -- the steering wheel. --.
Line 16, change "a the variable" to -- the variable --.
Line 18, change "over-steer characterist" to -- over-steer characteristic --.
Line 28, change "a gerneratrix of" to -- a generatrix of --.
Line 40, change "cable wound around" to -- cables wound around --.

Signed and Sealed this

Eleventh Day of October, 2005

JON W. DUDAS
*Director of the United States Patent and Trademark Office*